United States Patent
Kume et al.

(10) Patent No.: US 6,294,046 B1
(45) Date of Patent: Sep. 25, 2001

(54) HEAT-SEALING APPARATUS

(75) Inventors: Satoshi Kume; Hiroshi Katayama; Michio Ueda, all of Tokushima-ken (JP)

(73) Assignee: Shikoku Kakoki Co., Ltd., Tokushima-ken (JP)

( * ) Notice: Subject to any disclaimer, the term of this patent is extended or adjusted under 35 U.S.C. 154(b) by 0 days.

(21) Appl. No.: 09/370,853

(22) Filed: Aug. 10, 1999

(30) Foreign Application Priority Data

Aug. 10, 1998 (JP) .................................................. 10-225547

(51) Int. Cl.⁷ ............................. B29C 65/04; B29C 65/02
(52) U.S. Cl. .................................. 156/380.1; 156/380.4; 156/530; 156/581; 156/274.4; 156/309.6; 53/451; 53/479; 53/DIG. 2
(58) Field of Search ..................................... 156/198, 251, 156/274.4, 275.1, 282, 308.4, 309.6, 380.1, 380.3, 380.4, 380.5, 380.8, 443, 515, 530, 581; 53/451, 477, 479, 551, 373.7, 374.2, 375.3, DIG. 2

(56) References Cited

U.S. PATENT DOCUMENTS

| | | | |
|---|---|---|---|
| 4,135,957 | * | 1/1979 | Voller ..................................... 156/581 |
| 5,250,140 | * | 10/1993 | Hayashi et al. .................... 156/380.5 |

FOREIGN PATENT DOCUMENTS

| | | | |
|---|---|---|---|
| 0076966 A1 | * | 4/1983 | (EP) . |
| 55-3215 | | 1/1980 | (JP) . |
| 58-134744 | | 8/1983 | (JP) . |
| 5-269854 | | 10/1993 | (JP) . |
| 7-164523 | | 6/1995 | (JP) . |
| 8-230834 | | 9/1996 | (JP) . |
| 8-244728 | | 9/1996 | (JP) . |
| 2571977 | | 10/1996 | (JP) . |
| 9-240607 | | 9/1997 | (JP) . |
| 10-86915 | | 4/1998 | (JP) . |

* cited by examiner

Primary Examiner—Michael W. Ball
Assistant Examiner—Michael A. Tolin
(74) Attorney, Agent, or Firm—Venable; Robert Kinberg; Catherine M. Voorhees

(57) ABSTRACT

To provide a heat-sealing apparatus capable of: achieving a complete sealing property by causing a liquid or dirt having entered small irregularities in a tube inner face to flow out of a sealed zone together with a molten resin; and a heat seal with no crack caused by the molten resin having flowed into container and with an excellent compression strength. A heat-sealing apparatus for forming a packaging material 1 made of a laminate including a synthetic resin layer into a tubular-shape of a container, and transversely heat-sealing a tubular packaging material container filled with fluid by using a sealing jaw 3 having a high-frequency coil 2 with a ridge 11 on its flat pressing face and a jaw 5 opposing to it, wherein a first groove 16 is disposed on at least one pressing face of the high-frequency coil 2, capable of forming a synthetic resin bulge adjacent to the outer side of a zone to be sealed on a container's interior side.

8 Claims, 11 Drawing Sheets

HEAT-SEALING APPARATUS

CROSS REFERENCE TO RELATED APPLICATION

Priority is claimed with respect to Japanese Application No. 10/225547 filed Aug. 10, 1998, in the Japanese Patent Office, the disclosure of which is incorporated herein by reference.

BACKGROUND OF THE INVENTION

1. Field of the Invention

The present invention relates to a heat-sealing apparatus for use in a filling/packing machine for producing liquid beverages or the like which are packed in paper containers so that they can be stored for a long time and, more particularly, to a sealing apparatus for transversely heat-sealing a tubular packing material filled with contents, such as liquid beverages, together with fluid.

2. Description of the Related Art

Conventionally, when producing a packing container having a box shape filled with a liquid such as juice that is to be sealed, as shown in Japanese Patent Publication No. 3215/1980, it is well known to use a sealing apparatus in which a packing material including a laminate of paper, aluminum foil and a synthetic resin is continuously formed into a tubular shape while being conveyed. As shown in FIG. 1, the tubular packing material 1 is transversely heat-sealed with fluid by using pressing means including a sealing jaw 3 having a high-frequency coil 2 and an opposing jaw 5 having a sealing rubber 4 of hard rubber. Tubular material 1 is cut between two sealed zones having been heat-sealed by a cutting blade 6.

In Publication of Japanese Patent application Laid-Open Nos. 134744/1983, 269854/1993, 164523/1995 and 218805/1996, there is further disclosed a heat-sealing apparatus for heat-sealing a laminate material in which a ridge is formed on the pressing face of a high-frequency coil on a sealing jaw in the aforementioned heat-sealing apparatus so that molten resin is extruded into a sealed zone by the ridge.

In known heat-sealing apparatus, when molten resin is guided to flow toward a container's interior side of the sealed portion of a tubular packing material, corrugated molten resin beads are formed on the edge portion of the container's interior side so that cracks start from the crests of the beads to break the container when an external force is applied to the container. In order to avoid the above problem of the aforementioned heat-sealing apparatus, two magnetic members are arranged on the outer side (or the container's interior side) of the straight portions of a U-shaped high-frequency coil to leave a portion of the container's inner side unheated, as disclosed in Japanese Patent No. 2571977.

In the Publication of Japanese Patent Application Laid-Open No. 230834/1996, a high-frequency coil having a ridge in its longitudinal direction and grooves formed on the two sides of and in parallel with the ridge causes melted resin to remain in the grooves. Thus, the melted resin does not flow out of a sealed zone, even if the resin on the packing material is melted and pushed by the ridge. It is further described in heat-sealing apparatus of the prior art which do not have an aforementioned groove that the molten resin having flowed out of a sealed zone solidifies to stick to the interior side of a packing container thereby forming cracks during a shaping process after the sealing step.

In the Publication of Japanese Patent Application Laid-Open No. 244728/1996, on the other hand, a high-frequency coil which is inclined gradually at a greater distance than the sealed zone forming portion goes to the outer side (to the container's interior side) is employed so that the tube is heat-sealed whereby liquid and molten resin are discharged smoothly from the sealed zone to the container inner side, when the tube is pressed together with fluid.

In order to effect an excellent heat-sealing in a sealing apparatus for transversely heat-sealing a tubular packing material filled with contents such as a liquid beverage in the presence of the liquid, it is necessary to exclude the liquid from the sealed zone of the tube as much as possible when the tube is sealed with heat and under pressure. However, the inner face of a tube which is in contact with the liquid is not completely flat and has small irregularities, if observed in detail. In the heat-sealing apparatus disclosed in the aforementioned Publication of Japanese Patent Application Laid-Open Nos. 134744/1983, 269854/1993, 164523/1995, 240607/1997 or 230834/1996, a sealing method is adopted in which the molten resin can be prevented from flowing out of the sealed zone so that it remains in the sealed zone. Therefore, any liquid or dirt which may have entered the small irregularities in the tube inner face cannot be discharged to the outside of the sealed zone so that the sealing property cannot be said to be sufficient.

On the other hand, the inventors of this invention have discovered that any liquid in the sealed zone may be guided to flow out together with the molten resin to the outside of the sealed zone so as to clear the liquid or dirt in the irregularities when sealed, and have competed the invention, as disclosed in the aforementioned Publication of Japanese Patent Application Laid-Open No. 8-244728. The method using this heat-sealing apparatus can clear the liquid or dirt in the irregularities completely to provide an excellent sealing property, but the molten resin having flowed out to the container's interior side may not be homogeneously extruded. As shown in FIG. 2, undulating molten resin beads 7 are formed on the edge portion of the container's interior side. During a secondary step using a shaping machine after the sealing step, it has been found out that cracks start from crests 8 of the undulations of the beads 7 to cause liquid leakage although not frequently when a pressure is applied to the container.

SUMMARY OF THE INVENTION

An object of the present invention is to provide a heat-sealing apparatus capable of solving the aforementioned problems of the heat-sealing apparatus in the prior art, that is, a heat-sealing apparatus capable of ensuring sufficient fluidity of a resin without deteriorating the compression strength of the container. Specifically, the object is to provide a heat-sealing apparatus capable of: achieving a complete sealing property by causing any liquid or dirt that may have entered small irregularities in the tube inner face to flow out of the sealed zone together with the molten resin, and a heat seal with an excellent compression strength, as the seal is free from cracks caused by the molten resin having flowed in to a container's interior side.

The inventors of the present invention have developed a high-speed filling machine (Publication of Japanese Patent Application Laid-Open No. 86915/1998) provided with a sealing apparatus for transversely heat-sealing a tubular packing material, which is filled with contents such as a liquid beverage, together with fluid. The heat-sealing apparatus in this high-speed filling machine is not provided with a sealing jaw having both a heat-sealing portion and a cutting portion, unlike the aforementioned heat-sealing apparatus, but is provided with a cutting portion 10 for the step following sealing portion 9, as shown in FIG. 3. It follows, as shown in FIG. 4, that the heat-sealing apparatus used in the aforementioned high-speed filling machine is composed of a sealing jaw 3 having a high-frequency coil 2 and an opposed jaw 5 having a sealing rubber 4 but is not equipped with any cutting mechanism. In this heat-sealing apparatus 11, however, the pressure is applied to the whole face including a zone to be sealed so that the flow of the molten resin cannot be sufficient for achieving a complete seal. According to this known heat-sealing apparatus, any liquid which may have entered the small irregularities in the tube inner face is to be completely discharged together with the molten resin to the outside of the sealed zone. The flow of the liquid and molten resin is directed only to the container's interior side. With this inflow to the container's interior side, the corrugated molten resin beads are formed on the edge portion of the container's interior side. When an external force is applied to the container, cracks may start. Thus, it has been found that the heat-sealing apparatus of the prior art cannot achieve the complete seal in any event.

In order to solve such problems, first of all, the inventors of the present invention have performed a heat seal by using a heat-sealing apparatus, as shown in FIG. 5, which includes a second groove 12 on the outer side of the cutting side of the high-frequency coil 2 between the high frequency coil 2 and a magnetic member 13. The high-frequency coil 2 has a ridge 11 as does magnetic member 13 on the outer side of the container inner side so as to cause the liquid having entered the aforementioned irregularities to flow out together with the molten resin to the cutting side. The fluidity of the molten resin has been improved, but this molten resin flows out to the cutting side so that the discharge of the liquid such as juice from the cutting side so that the discharge of the liquid such as juice from the cutting portion is not sufficient. Thus, it has been found that the liquid bulge blots the cutter blade or the system itself to raise a new problem in the sanitary aspect such as fungus.

Therefore, the inventors of the present invention have reached a concept different from that of the heat-sealing apparatus of the prior art, that is, a concept of guiding the molten resin positively to flow out to the container's interior side. According to the finding, if a first groove is formed adjacent to the outer side of a high-frequency coil on a container's interior side so that the molten resin is guided to flow into the first groove, the fluidity of the molten resin is improved. In addition, even if a molten resin bead is formed but without any irregularity, no crack is formed against the external force applied to the container so that a complete heat seal can be achieved. When this finding was applied to the heat-sealing apparatus having the cutting mechanism of the prior art, it has been found out that a complete heat seal can also be achieved to complete the invention.

The present invention relates to a heat-sealing apparatus comprising means for forming a packing material made of a laminate including a synthetic resin layer into a tubular-shape, a zone (a sealing zone) heat-sealed by applying heat and pressure to the innermost synthetic resin layer of the tubular packing material filled with fluid, and a pair of open-and-closable pressing members having a heating mechanism capable of forming the outer side of a container wherein a first groove is disposed on at least one pressing face of the pair of pressing members, capable of forming a synthetic resin bulge adjacent to the outer side of a zone to be sealed on a container's interior side. The above-identified heat-sealing apparatus of the present invention maybe modified wherein the laminate further has an aluminum foil layer, and the pair of open-and-closable pressing members having the heating mechanism includes a sealing jaw provided with a high-frequency coil having a flat pressing face on the pressing face of the pair of pressing members and a jaw opposing to the sealing jaw.

The present invention further relates to: a heat-sealing apparatus wherein the first groove is formed adjacent to the outer side of a high-frequency coil having a flat pressing face on a container's interior, or formed over a portion of the container's interior side and its outer side of the high-frequency coil having a flat pressing face; a heat-sealing apparatus wherein the first the groove is formed on the two outer sides of the high-frequency coil having the flat pressing face; a heat-sealing apparatus wherein a second groove is formed adjacent to the outer side of the cutting side of a high-frequency coil having a flat pressing face; and a heat-sealing apparatus wherein the first groove is arcuate in cross section having a depth smaller than one half of the width.

Furthermore, the present invention relates to such a heat-sealing apparatus where the high-frequency coil has a flat pressing face with a ridge wholly or partially in its length; and a heat-sealing apparatus that further comprises a cutting member on one side of the pair of pressing members for cutting a packing material between sealed zones.

The packing material made of the laminate including the synthetic resin layer in the invention can be exemplified by a laminate which is composed of: a synthetic resin layer such as polyethylene to be heat-sealed by heating means to the innermost face; a paper sheet for keeping the rigidity of the container; and an aluminum foil layer or a synthetic resin film layer impermeable to air or bacteria into the container. When a heating mechanism utilizing high frequencies is adopted, the laminate including the aluminum foil layer is used. When the heating mechanism adopted utilizes impulses or ultrasonic waves, the aluminum foil layer is not indispensable, but a laminate including an oxygen-impermeable synthetic resin film layer can be used.

In the invention, the sealed zone is a portion which is heat-sealed by applying heat and pressure to the innermost face synthetic resin layer of the packing material by using a pair of open-and-closable pressing members having a heating mechanism. An end portion in a direction perpendicular to the longitudinal direction of the sealed zone is a side including content such as juice, i.e., the container's interior side. The tubular packing material is generally made into two containers, one on either side of the pair of pressing members. The other end portion makes a cutting side for cutting containers one by one. Additionally, in this invention, an pressing face of pressing members corresponding to the sealed zone will be conveniently called a zone to be sealed.

The heating mechanism for the pressing members in the invention can be exemplified, as described hereinbefore, by the heating mechanism using high frequencies, impulses and ultrasonic waves. In the heat seal using high frequencies, however, the boundary between the heated region and the unheated region is more heterogeneous than the heat seal using ultrasonic waves or the like so that the boundary of the sealed zone has a tendency to become heterogeneous. However, by providing the first groove on the pressing member outside the zone to be sealed as in the invention, the resin bulge to be formed is straight but not irregular so that the boundary of the sealed zone is homogenous. If high frequencies are used for the heating mechanism of pressure members in the invention, therefore, it is advantageous that the effects of the invention can be enjoyed in particular.

In the invention, as a heat-sealing apparatus for forming a packing material into a tubular-shape, and transversely heat-sealing the tubular packing material, which is filled with contents such as juice, from its outside by using a pair of open-and-closable pressing members having a heating mechanism, the aforementioned heat-sealing apparatus of the prior art can be used except a first groove is formed on its pressing member outside the high-frequency coil. A pair of pressing members in this heat-sealing apparatus is generally composed of a pressing member having (as will be called a "sealing jaw") equipped with a heating portion using the impulses or a heating source using high frequencies or ultrasonic waves, and a pressing member (as will be called an "opposing jaw") without the heating portion or the heating source. However, a pair of pressing members could be exemplified by one pressing member having a heating portion using impulses and the other having a heating source using ultrasonic waves.

Moreover, the heat-sealing apparatus of the invention is characterized in that a first groove is disposed on at least one pressing face of the pressing members, capable of forming a synthetic resin bulge adjacent to the outer side of a zone to be sealed on a container's interior side. This first groove may be formed in the pressing faces of either one of the pair of pressing members, either in the pressing face of a sealing jaw or an opposing jaw. In the latter case, the first groove is usually arranged in the pressing face of the sealing jaw.

In the invention, in case the packing material is exemplified by the laminate including the synthetic resin layer and the aluminum foil layer and in case a pair of open-and-closable pressing members having the heating mechanism are exemplified by the sealing jaw having a high-frequency coil having a flat pressing face and an opposing jaw having a sealing rubber, the aforementioned first groove is desirably formed adjacent to the outer side of a high-frequency coil having a flat pressing face on a container's interior side and its outer side of a high-frequency coil having a flat pressing/ action, preferably into an arcuate shape in cross section having a depth of one half or less of the width, such as about one third.

With this first groove, the synthetic resin layer on the innermost face of the packing material in a zone to be sealed is melted by the action of the pressing members having the heating mechanism so that the molten resin is extruded together with the contents such as juice or the foreign substances such as dirt having stuck to the synthetic resin layer surface toward the container's interior side. The resin having flowed out of the sealed zone flows into the first groove so that the synthetic resin bulge is formed adjacent to the outer side of the zone to be sealed on a container's interior side. Therefore, a thin synthetic resin layer having no foreign substance and an excellent sealing property is formed in the sealed zone.

Additionally, the width and depth of the first groove are desirably set such that the first groove is filled up with the resin having flowed out of the sealed zone to form the synthetic resin bulge having a straight seal edge and a uniform width with no irregularity. Then, no crack starts from the synthetic resin bulge having the uniform width. Moreover, this synthetic resin bulge will not contribute to the sealing property so much because it contains the foreign substances, as described hereinbefore, but can be said to enhance the sealing strength.

When the sealing jaw is equipped with a high-frequency coil having a U shape or the like to heat-seal the tubular packing material simultaneously at two portions through a portions to be cut, two grooves are preferably formed, for example, in the two outer sides of the high-frequency coil having the flat pressing face. As a result, a resin bulge is formed in the outer sides on the two container's interior sides.

In the invention, a second groove can also be formed adjacent to the outer side of the cutting side in addition to the container inner face side of the high-frequency coil having the flat pressing face. This second groove can also be formed adjacent to the outer side of the cutting side, is disposed adjacent to the heating region so that the molten resin having been extruded from the sealed face, flows into that second groove, too. By forming the second groove, when the synthetic resin layer on the innermost face of the packing material in the zone to be sealed is melted, a portion of the molten resin in the zone to be sealed is forced to flow toward the cutting side into the second groove thereby to form the synthetic resin bulge adjacent to the outer side of the cutting side, so that one thin synthetic resin layer having no foreign substance is formed in the sealed zone. Moreover, the synthetic resin bulge thus formed adjacent to the outer side of the cutting side is not required, unlike that of the outer side on the container's interior side, to have a uniform thickness having the straight sealed edge but no irregularity.

Moreover, it is preferable for reliably preventing the sealing defect, as might otherwise be cause by a tunnel formed by creases existing in advance in the packing material, that a ridge is formed partially in the longitudinal direction of the aforementioned high-frequency coil having the flat pressing face. However, the ridge may be formed wholly in the longitudinal direction of the high-frequency coil. Further, the location to form the ridge can be suitably selected to be near the container's interior side or the cutting side, if it is within the zone to be sealed. Furthermore, the heat-sealing apparatus of the invention may be equipped at its pressing members with the cutting mechanism as in the heat-sealing apparatus of the prior art.

DETAILED DESCRIPTION OF THE PREFERRED EMBODIMENT

Figure 1:
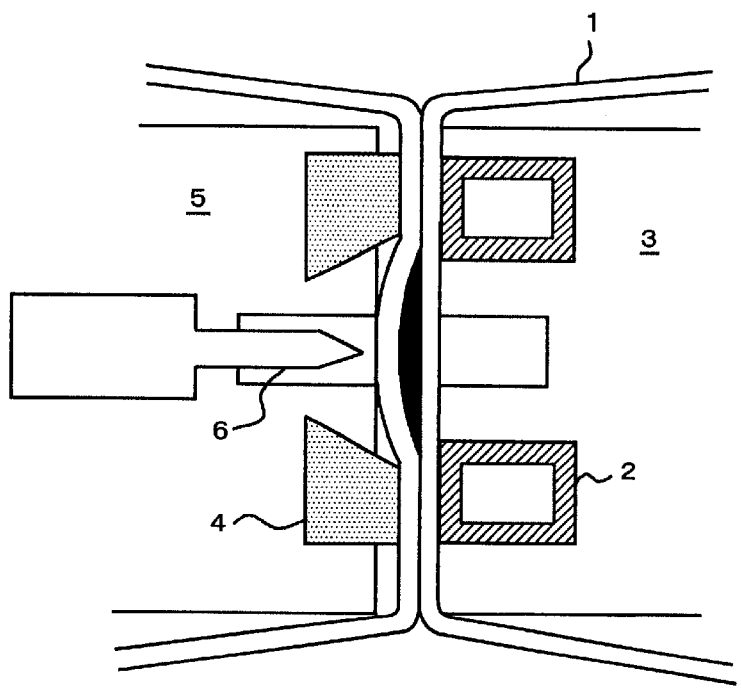
FIG. 1 is a schematic longitudinal section of a heat-sealing apparatus of the prior art.
Figure 2:
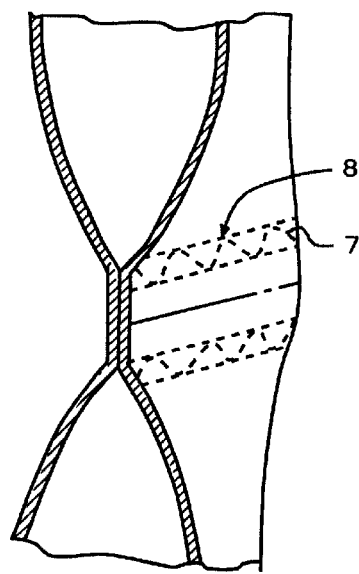
FIG. 2 is a schematic perspective view of a heat-sealed portion using the heat-sealing apparatus of the prior art.
Figure 3:
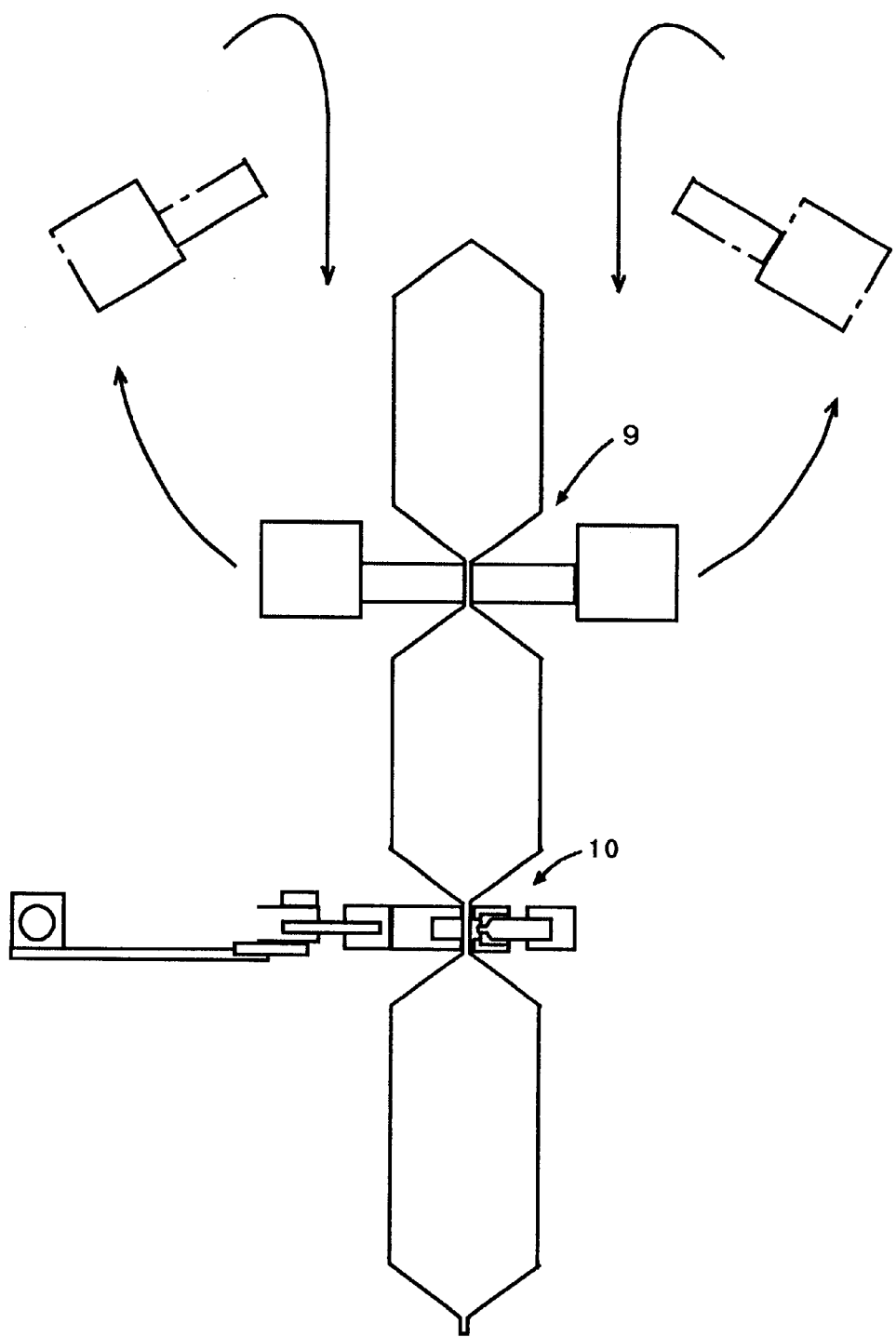
FIG. 3 is a diagram for explaining the actions of a high-speed filling machine of the prior art in which a sealing portion and a cutting portion are separated.
Figure 4:
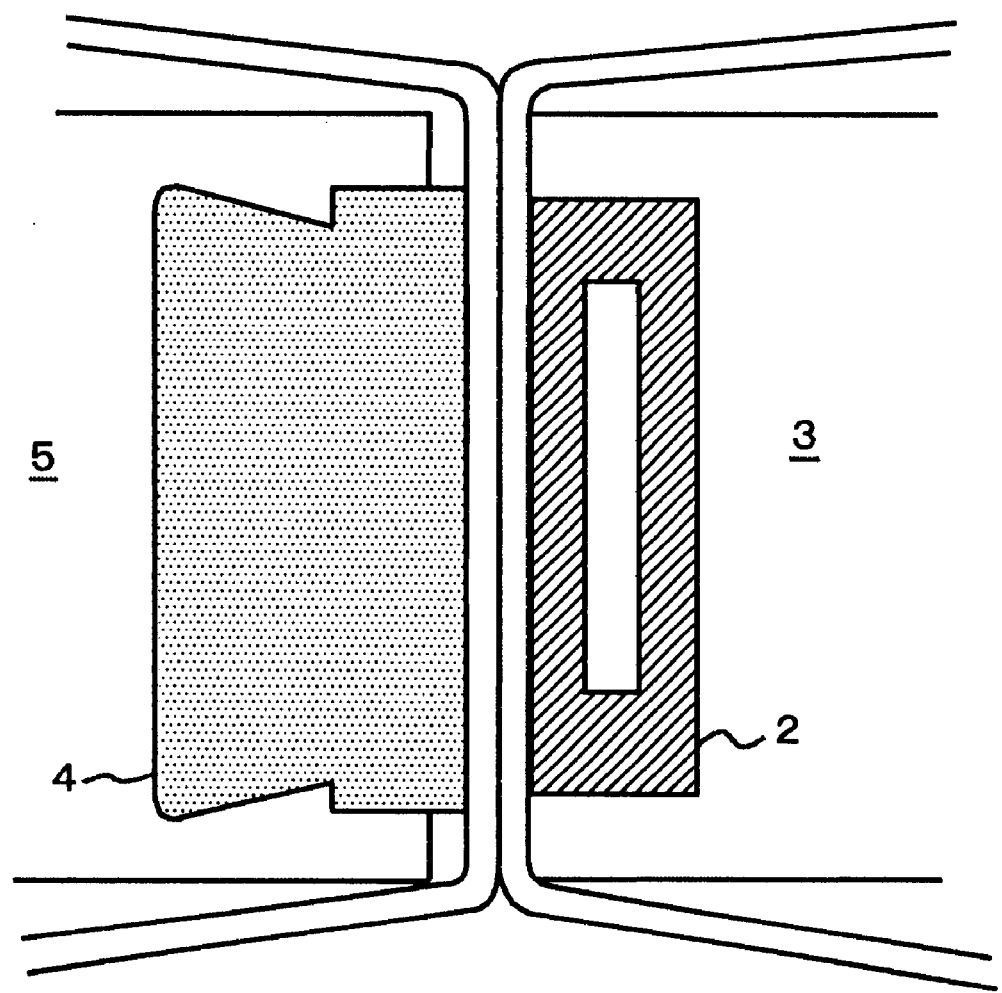
FIG. 4 is a schematic longitudinal section of another heat-sealing apparatus of the prior art.
Figure 5:
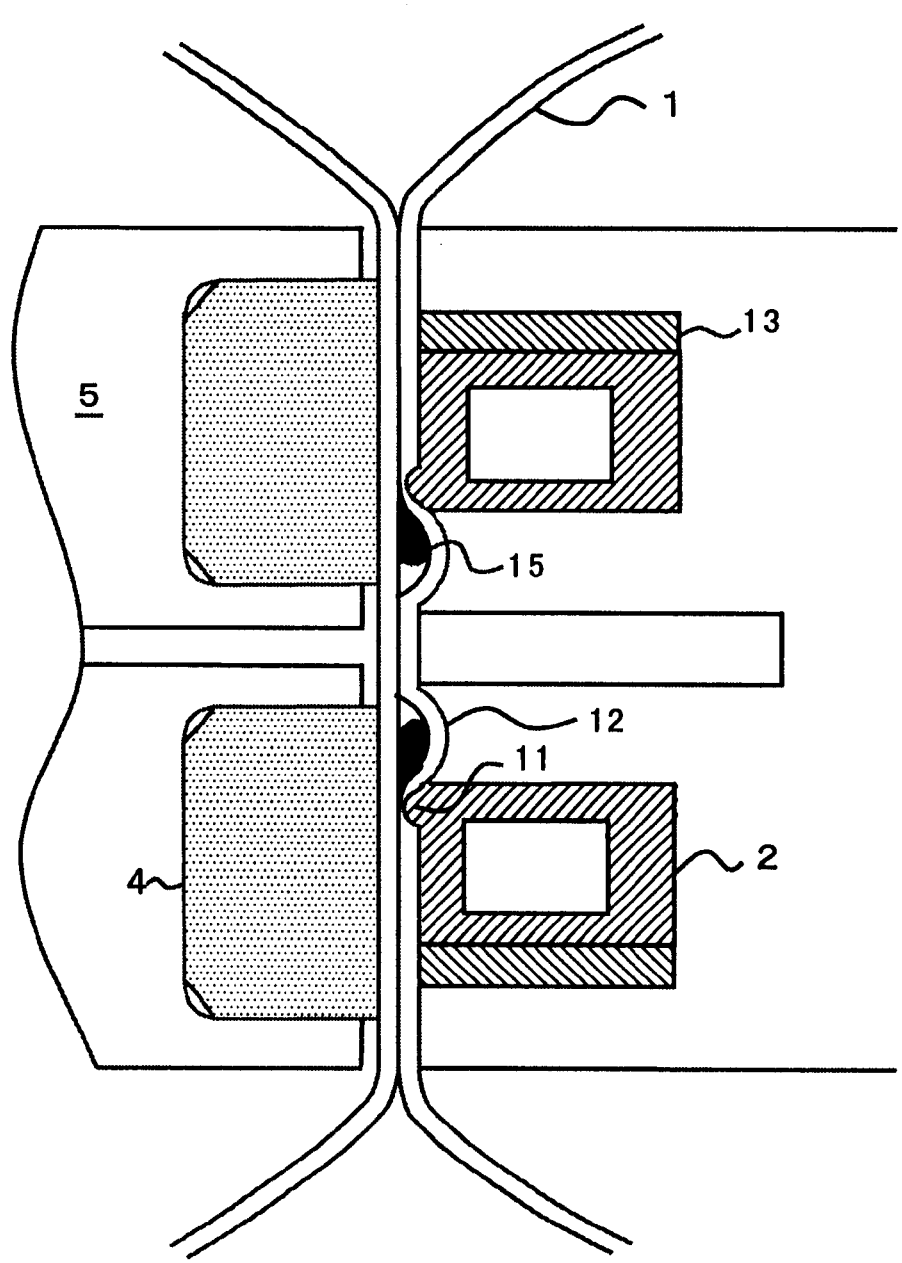
FIG. 5 is a schematic longitudinal section of still another heat-sealing apparatus of the prior art.

A heat-sealing apparatus according to the invention will be described with reference to FIGS. 6–11, but the invention should not be limited to the disclosure of those Figures.

The heat-sealing apparatus of the invention, as shown in FIGS. 6–11, employs a laminate of a synthetic resin layer and an aluminum foil layer as a packing material 1, and is equipped with a pair of open-and-closable pressing members having a heating mechanism. These pressure members are composed of a sealing jaw 3 equipped with a high-frequency coil 2, with a flat pressing face, having a cooling water passage 14 therein, and an opposing jaw 5 having a sealing rubber 4. In the sealing jaw 3, there is formed a first groove 16 capable of forming a synthetic resin bulge 15 adjacent to the outer side of a zone to be sealed on a container's interior side.

Figure 6:
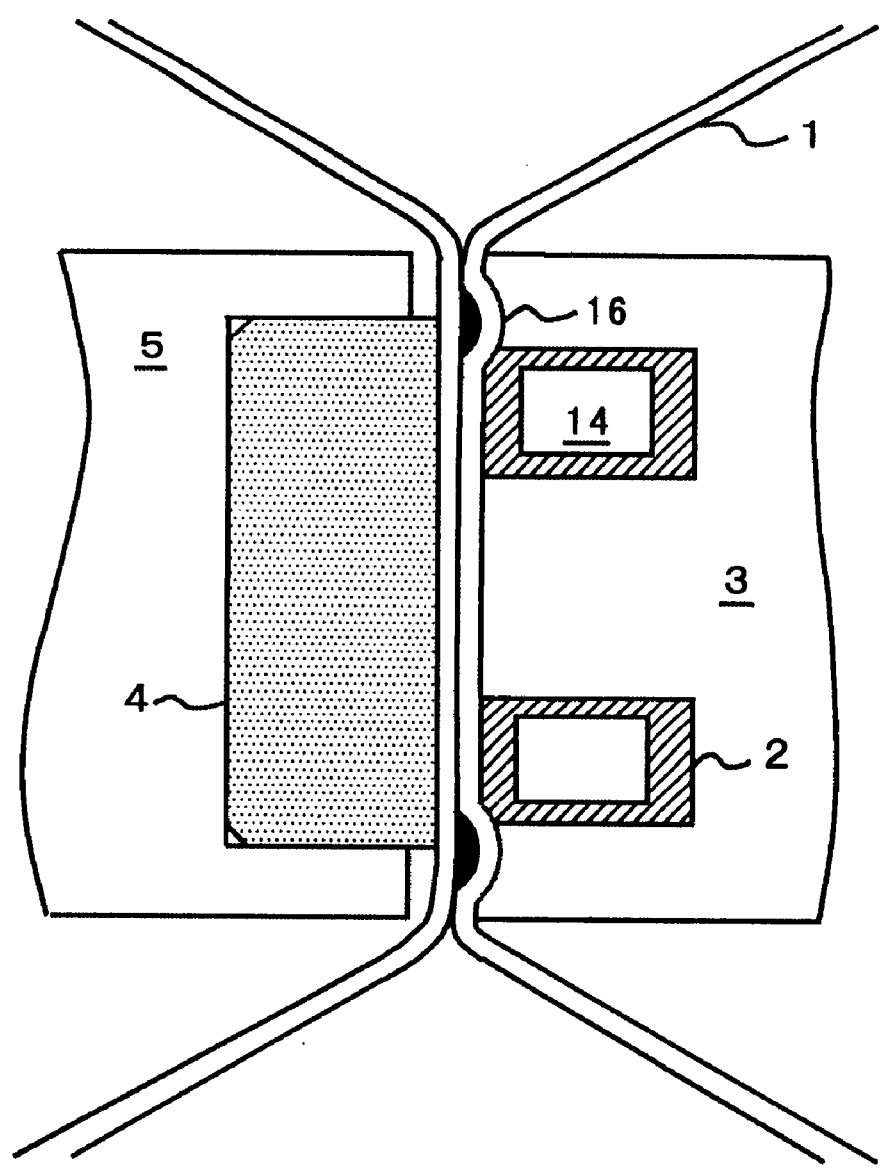
FIG. 6 is a schematic longitudinal section of a heat-sealing apparatus of the invention.
Figure 7:
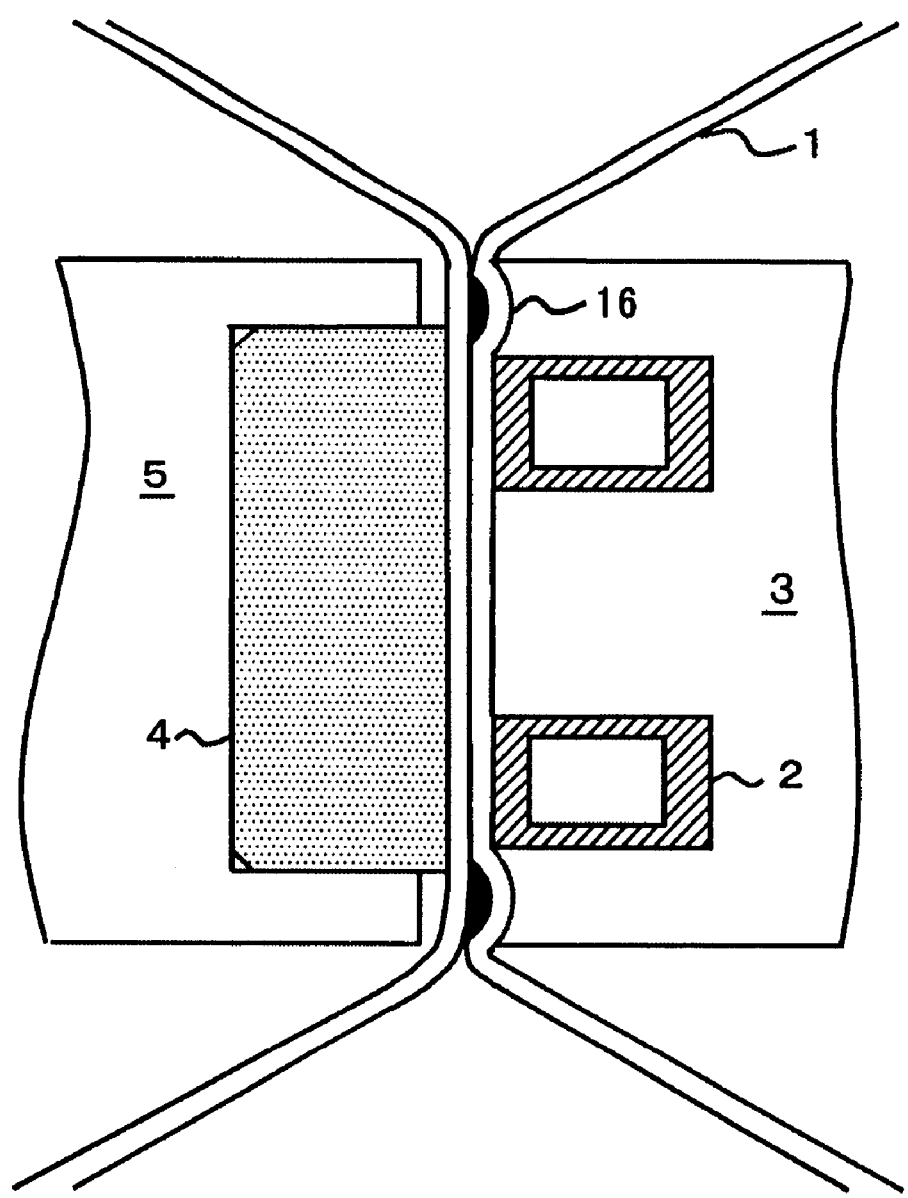
FIG. 7 is a schematic longitudinal section of another heat-sealing apparatus of the invention.
Figure 8:
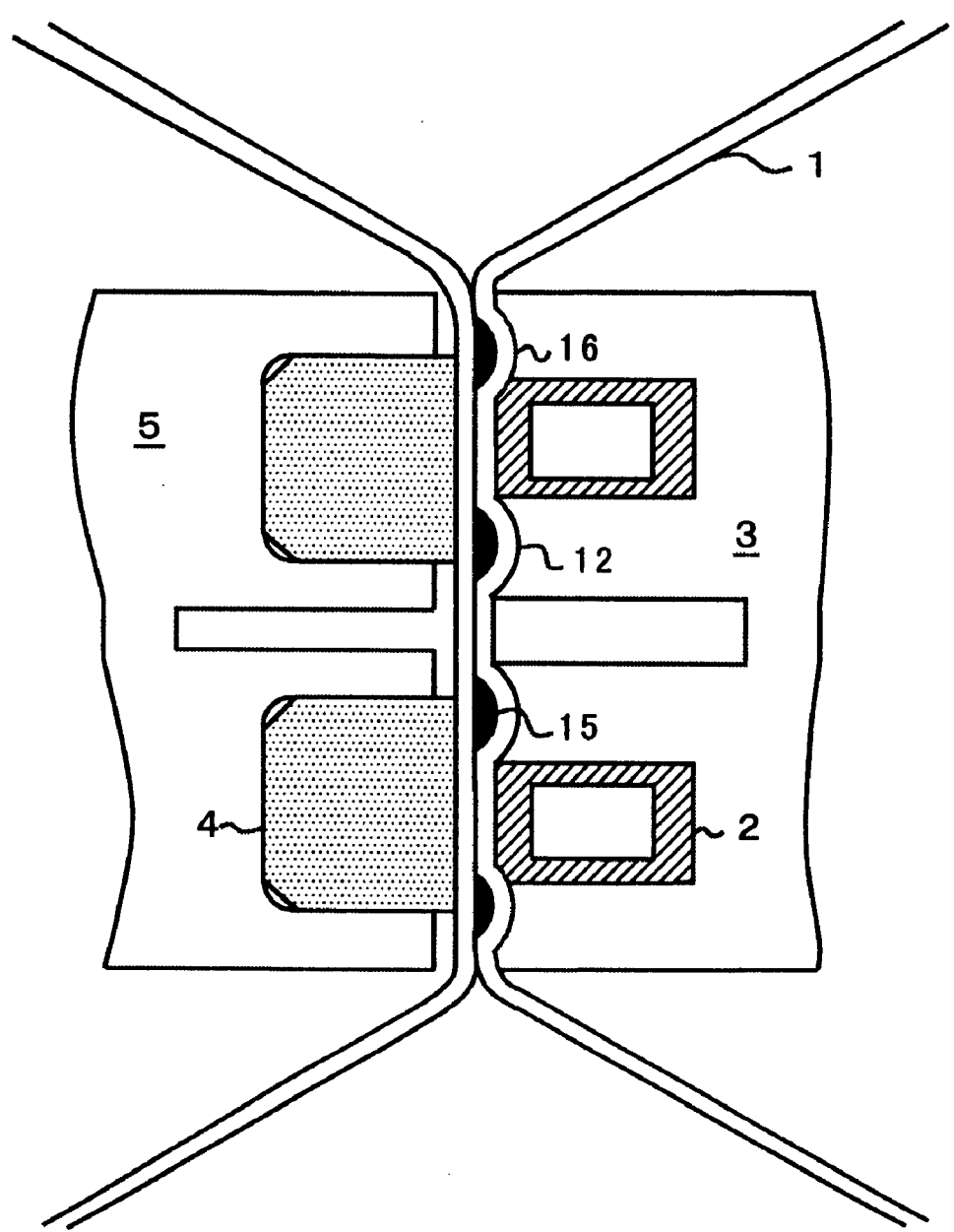
FIG. 8 is a schematic longitudinal section of still another heat-sealing apparatus of the invention.
Figure 9:
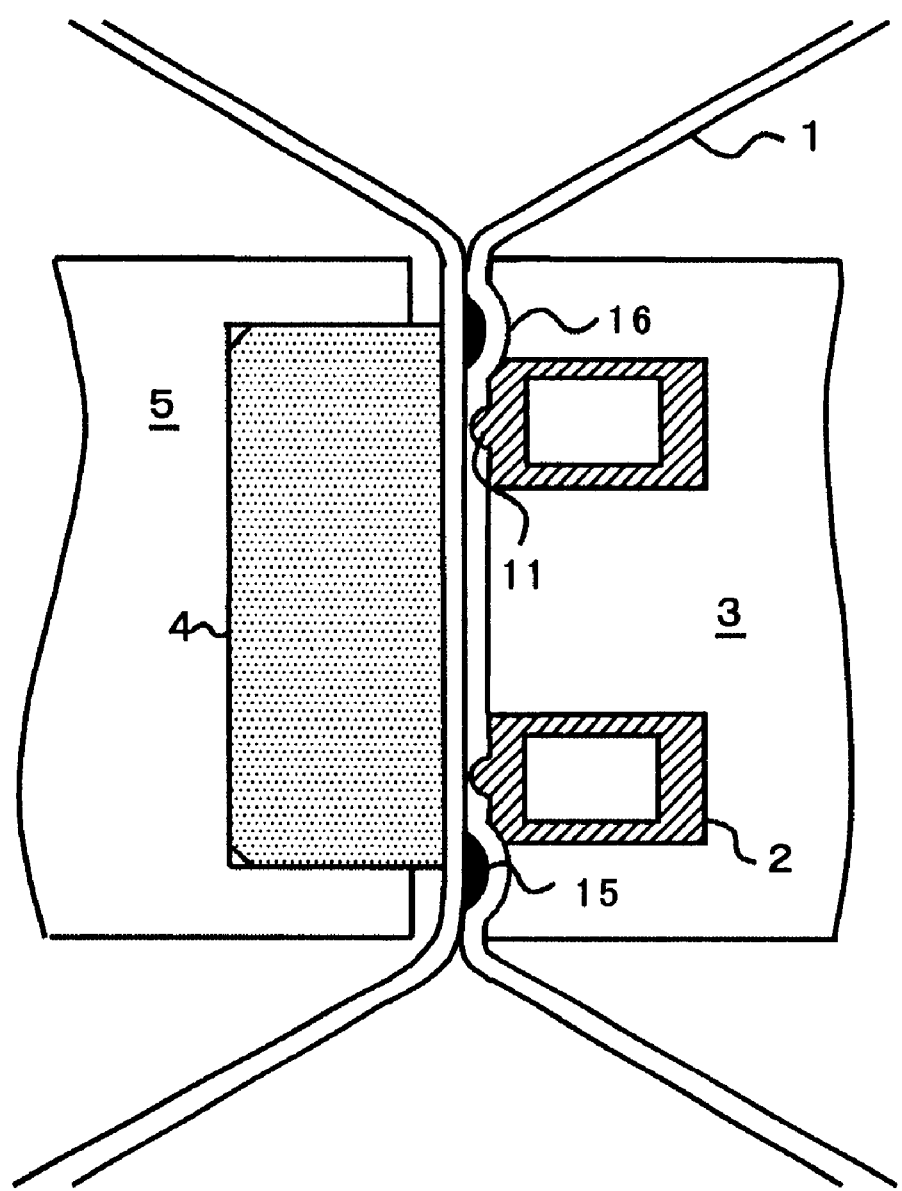
FIG. 9 is a schematic longitudinal section of a heat-sealing apparatus having a ridge of the invention.
Figure 10:
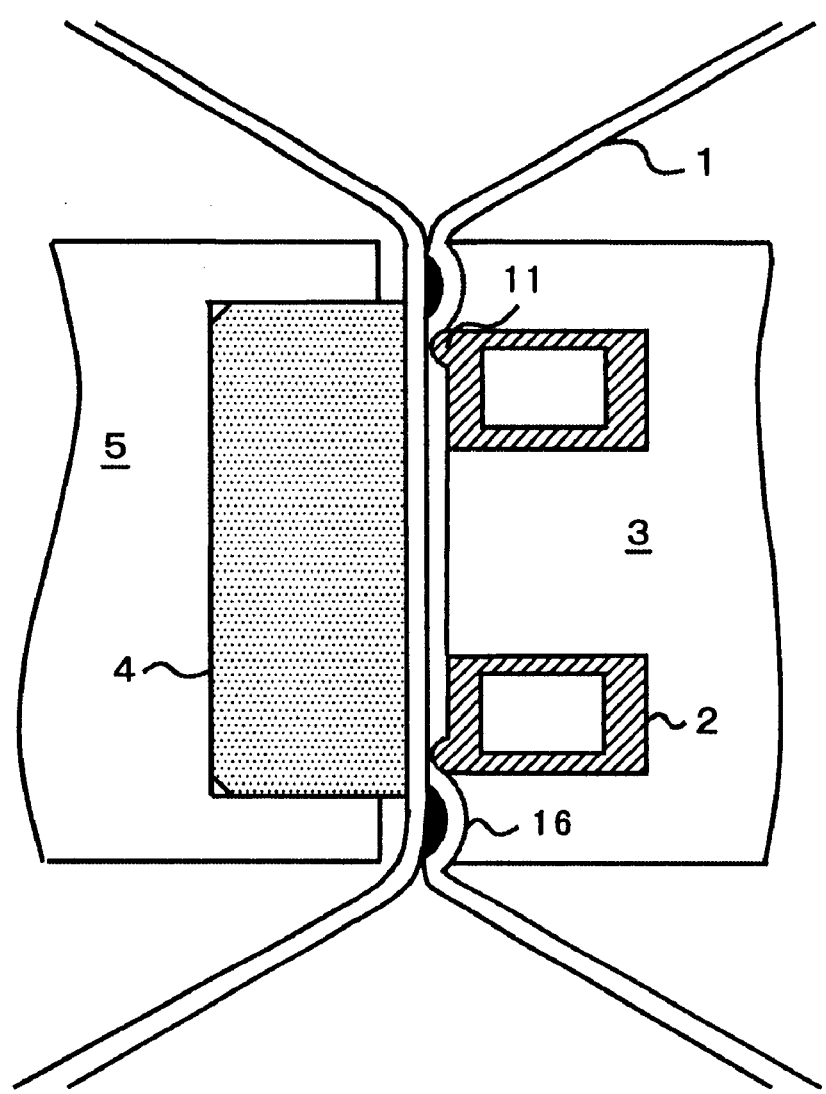
FIG. 10 is a schematic longitudinal section of another heat-sealing apparatus having a ridge of the invention.
Figure 11:
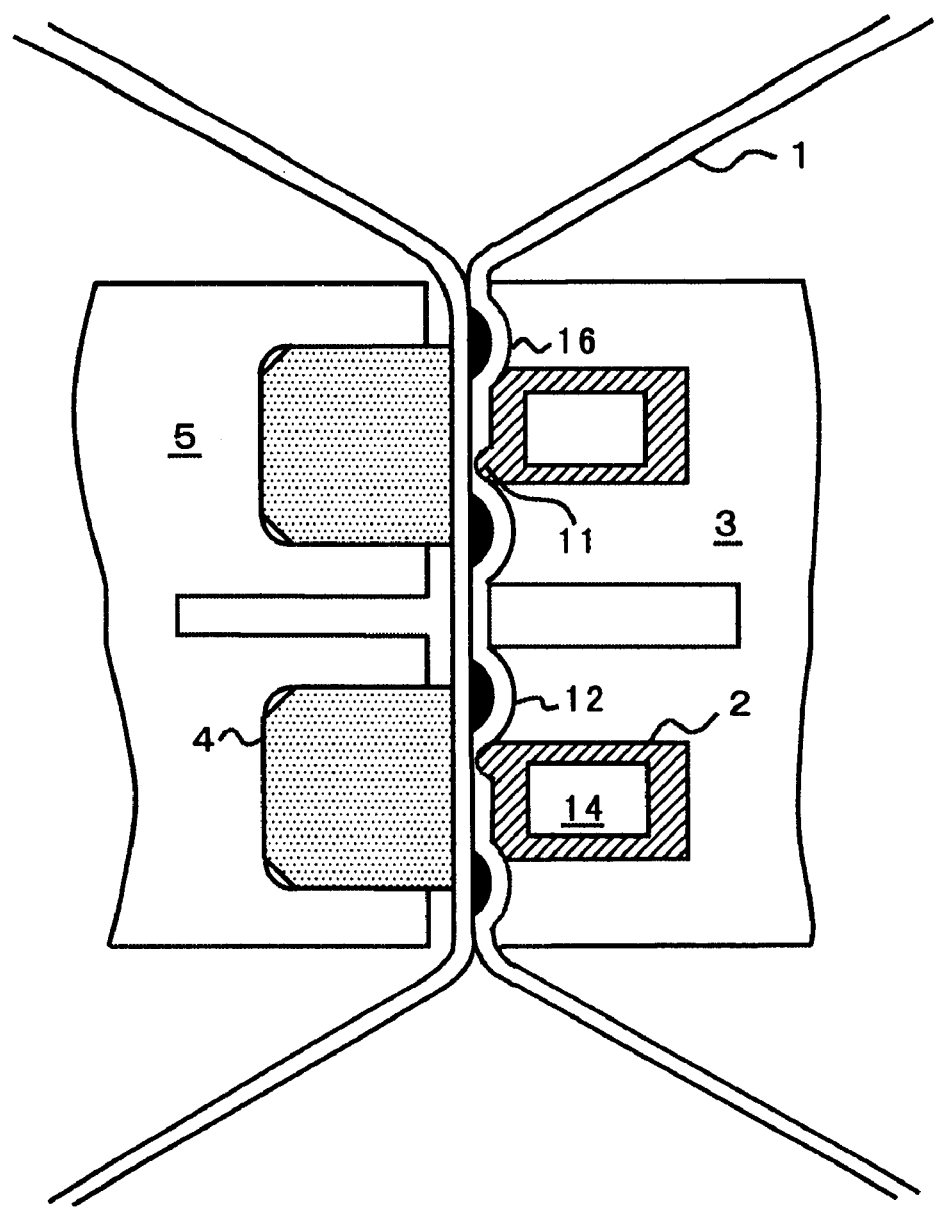
FIG. 11 is a schematic longitudinal section of still another heat-sealing apparatus having a ridge of the invention.
Figure 12:
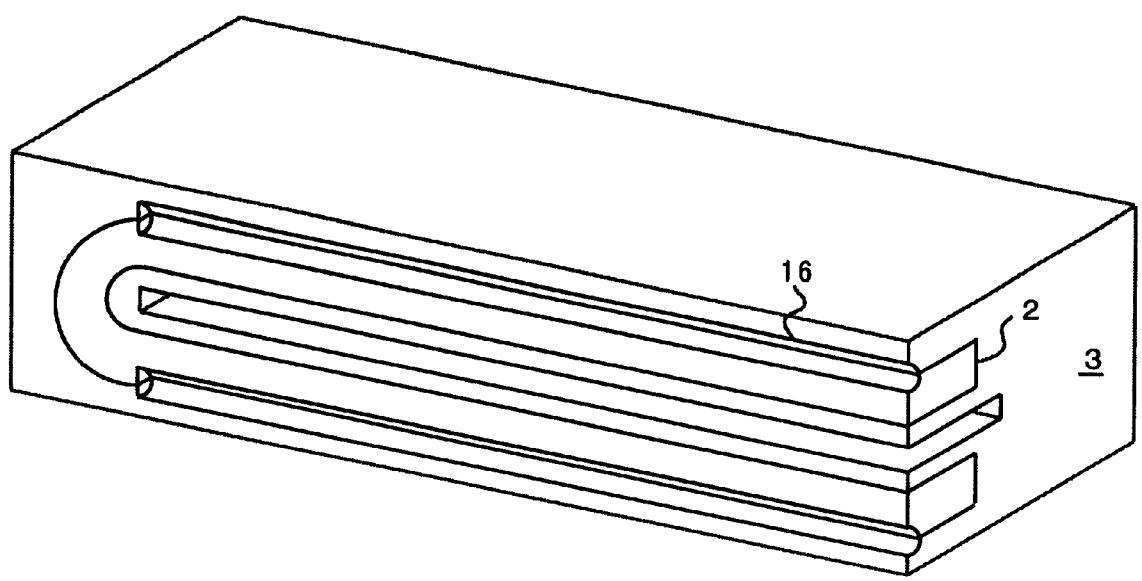
FIG. 12 is a schematic perspective view of a heat-sealing jaw in a heat-sealing apparatus of the invention.

In a heat-sealing apparatus shown in FIG. 6, moreover, the first groove 16 is formed over a portion of a container's interior side and its outer side of the high-frequency coil 2 having the flat pressing face. In a heat-sealing apparatus shown in FIG. 7, the first groove 16 is formed adjacent to the outer side of the high-frequency coil 2 having the flat pressing face on a container's interior side. Further, FIG. 8 depicts a heat-sealing apparatus in which a second groove 12 is formed adjacent to the outer side on the cutting side in addition to the first groove 16 formed on the container's interior side of the high-frequency coil 2 having the flat pressing face. In FIGS. 9 to 11, there is shown a heat-sealing apparatus, which has a ridge 11 on the flat pressing face of the high-frequency coil 2 of the sealing apparatus shown in FIGS. 6 to 8. In FIG. 12, still further, there is shown a heat-sealing apparatus in which the two first grooves 16 formed on the container's interior side are disposed on the two outer sides of the high-frequency coil 2 having the flat pressing face.

According to the invention, the liquid bulge of the cutting portion can be reduced to produce more sanitary packs. Moreover, the molten resin having flowed out of the sealed zone together with the foreign substances forms a resin bulge of a uniform width so that no crack starts from that portion, and the sealed zone can be cleared of the foreign substances so that excellent heat seals can be achieved.

What is claimed is:

1. A heat-sealing apparatus comprising:
   tube-forming means for forming a packing material made of a laminate including a synthetic resin layer into a tubular-shape of a container; and
   a pair of open-and-closable pressing members with a heating mechanism where each pressing member of the pair is positioned on opposite sides of a tubular packing material filled with fluid, said pressing members forming a sealing zone by applying heat and pressure to the innermost synthetic resin layer of the tubular packing material filled with fluid and forming a container with an interior side adjacent the fluid and an outer side adjacent the pressing members,
   wherein each pressing member has a pressing face, a first groove is disposed in at least one of the pair of pressing members outside of said heating mechanism, and said first groove forms a synthetic resin bulge adjacent to an outer side of a zone to be sealed on the resultant container's interior side when said pressing members apply heat and pressure to the tubular packing material.

2. A heat-sealing apparatus according to claim 1, wherein the laminate further has an aluminum foil layer, and the pair of open-and-closable pressing members having the heating mechanism includes a sealing jaw provided with a high-frequency coil having a flat pressing face and a jaw opposing to the sealing jaw, said flat pressing face of the high-frequency coil being located adjacent the pressing face of one of the pressing members.

3. A heat-sealing apparatus according to claim 2, wherein the first groove is formed adjacent to an outer side of the high-frequency coil having a flat pressing face so that the resultant resin bulge on the container's interior side is formed outside of the sealing zone.

4. A heat-sealing apparatus according to claim 3, wherein the first groove is formed on the two outer sides of the high-frequency coil having a flat pressing face.

5. A heat-sealing apparatus according to claim 3, wherein a cutting action occurs through the packing material after the packing material is pressed by the open-and-closable pressing members, and;
   wherein a second groove on a pressing member is formed adjacent to the cutting side of the high-frequency coil having a flat pressing face.

6. A heat-sealing apparatus according to claim 3, wherein the first groove is arcuate in cross section having a depth smaller than one half of the width.

7. A heat-sealing apparatus according to claim 2, wherein the high-frequency coil having a flat pressing face has a ridge extending wholly or partially along its length.

8. A heat-sealing apparatus according to claim 1,
   wherein the pressing members further include a cutting mechanism.

* * * * *